US 8,032,024 B2

(12) United States Patent
Centanni et al.

(10) Patent No.: US 8,032,024 B2
(45) Date of Patent: Oct. 4, 2011

(54) METHOD AND APPARATUS FOR MULTI-BAND OPTICAL SWITCHING USING MULTI-PUMP PARAMETRIC DEVICES

(75) Inventors: Joseph Carmine Centanni, Oceanport, NJ (US); Andrew Roman Chraplyvy, Matawan, NJ (US); Alan H. Gnauck, Middletown, NJ (US); Robert Meachem Jopson, Rumson, NJ (US); Colin J. McKinstrie, Manalapan, NJ (US); Stojan Radic, Middletown, NJ (US)

(73) Assignee: Alcatel Lucent, Paris (FR)

( * ) Notice: Subject to any disclaimer, the term of this patent is extended or adjusted under 35 U.S.C. 154(b) by 1797 days.

(21) Appl. No.: 10/734,803

(22) Filed: Dec. 12, 2003

(65) Prior Publication Data

US 2005/0129412 A1 Jun. 16, 2005

(51) Int. Cl.
*H04J 14/00* (2006.01)
*H04B 10/00* (2006.01)
(52) U.S. Cl. .......................................... 398/48; 398/176
(58) Field of Classification Search .................... 398/45, 398/48, 175, 176
See application file for complete search history.

(56) References Cited

U.S. PATENT DOCUMENTS

| 5,127,928 | A | * | 7/1992 | Farries et al. ................... 65/394 |
| 5,386,314 | A | | 1/1995 | Jopson |
| 5,604,618 | A | | 2/1997 | Mori et al. |
| 5,825,517 | A | | 10/1998 | Antoniades et al. .......... 359/117 |
| 5,943,149 | A | * | 8/1999 | Cearns et al. ................... 398/79 |
| 6,424,774 | B1 | * | 7/2002 | Takeda et al. ................. 385/122 |
| 6,876,487 | B1 | * | 4/2005 | Marshall ........................ 359/332 |
| 2002/0054404 | A1 | * | 5/2002 | Hedekvist et al. ............ 359/108 |
| 2002/0118415 | A1 | * | 8/2002 | Dasylva et al. ............... 359/124 |
| 2004/0100681 | A1 | * | 5/2004 | Bjarklev et al. ............... 359/326 |
| 2005/0280886 | A1 | * | 12/2005 | Chou et al. .................... 359/326 |

FOREIGN PATENT DOCUMENTS

EP 1 202 478 A 5/2002
JP H09-033967 2/1997

OTHER PUBLICATIONS

"Fast tunable wavelength conversion for all-optical packet switching"; Ciaramella et al.; Photonics Technology Letters, IEEE; vol. 12, Issue 10, Oct. 2000, pp. 1361-1363.*
European Search Corresponding EP 04 25 7330, May 31, 2005, Lucent Technologies Inc.
Radic S et al Optical Society of America/Institute of Electrical and Electronics Engineers: "New class of continuous wave parametric amplifiers" Optical Fiber Communication Conference and Exhibit (OFC). Technical Digest. Postconference Digest. Anaheim, CA, March Photonics Series. (TOPS), Washington, D.C.: OSA, US, vol. TOPS. vol. 70, Mar. 17, 2002, pp. 850-852.
Alexander et al., "A Precompetitive Consortium on Wide-Band All-Optical Networks," J Lightwave Tech., 11(5/6), 714-735 (1993).
McKinstrie, et al., "Parametric amplifiers driven by two pump waves," IEEE J. Sel, Top, Quantum Electron, 8, 539-547 (2002).
Translation of Office Action for JP 2004-357595, Jun. 24, 2010, copy consists of 3 pages.

* cited by examiner

*Primary Examiner* — Nathan Curs
(74) *Attorney, Agent, or Firm* — Wall & Tong, LLP

(57) ABSTRACT

A method of multiple-band switching using a multi-pump fiber parametric switch is demonstrated. The switching architecture combines parametric band amplification, wavelength conversion and selective signal conjugation, enabled by temporal control of at least one pump of the multi-pump parametric device. The switching speed of the present invention is limited by the rise time of the controlled pump(s).

22 Claims, 5 Drawing Sheets

METHOD AND APPARATUS FOR MULTI-BAND OPTICAL SWITCHING USING MULTI-PUMP PARAMETRIC DEVICES

FIELD OF THE INVENTION

This invention relates to the field of optical switching and, more particularly, to multi-band optical switching using multi-pump parametric devices.

BACKGROUND OF THE INVENTION

To date, most communication networks use optical fiber as a point-to-point provider with electro-optical transmitters and receivers providing the conversion of optical signals to electrical signals at important points, e.g. switches, in the network. However, because the net throughput is limited by the electronics, such architectures do not effectively utilize the available bandwidth of the optical fibers used for transmission.

Wavelength-division multiplexing (WDM), as applied to optical communications, impresses several data signals upon respective optical carriers of different wavelengths. The optical signals are combined upon a single optical fiber at its transmitting end. At the receiving end of the optical fiber, the optical carriers are optically demultiplexed into beams each carrying a single data signal, and conventional optical detectors are dedicated to each of these beams. Although this simple WDM architecture increases the fiber throughput by the factor of the number of optical carriers, the nodes of the network become complex and expensive because of the need to convert optical signals to electrical signals at various points in the network. As such, there exists a need for low-cost, highly efficient all-optical switches.

Various prior art concepts have been developed for all-optical WDM networks in which the nodes of the networks switch different ones of the WDM wavelength channels in different directions without ever converting the optical signals to electronic form. For example, early implementations of transparent all-optical networks include wavelength-division multiplexing (WDM) switches which can selectively switch the wavelength-multiplexed optical signals in different directions dependent upon their wavelengths. The signals are not converted to electrical form at the switches but remain in optical form throughout. In such transparent all-optical networks, access nodes are interconnected through the WDM switches, the destination access node of a signal leaving an originating access node being determined by the wavelength of its optical carrier. The WDM switches are reconfigurable within times of the order of seconds and remain in a set configuration for minutes or even days. The reconfigurability allows the optical wavelengths to be reallocated to connecting different pairs of the access nodes. Such a switching of WDM signals is referred to as space switching even though the signals are switched in different directions with the directions being determined by the wavelength.

It should be noted however, that the number of discrete wavelength channels is limited. For example, a network of sufficient size requires amplification, which at the present time depends upon erbium-doped fiber amplifiers having an amplification bandwidth of about 40 nm. With a realistic optical channel spacing of about 4 nm in a moderately simple architecture, such a bandwidth can accommodate only about 10 optical channels. Hence, wavelength reuse will be required, but the wavelength reuse in such networks is limited. Such limited reuse is insufficient for a network intended to connect large numbers of users in a public network. More extensive wavelength reuse is required. Of perhaps greater importance, on a larger scale, one or more of the access nodes, may simultaneously be connected to another transparent all-optical network with additional access nodes attached to the second network. This architecture allows the overall network to be scaled to very large sizes, however, the scalability requires that an access node connecting the two networks be able to translate the wavelength for the optical carrier of the data signal being transferred between the two all-optical networks to a wavelength dictated by the second network. That is, large WDM networks will require wavelength translation of a signal at many points in the network.

Several switches have been proposed for wavelength translation of a signal in a WDM system. For example, an all-optical switch previously proposed for wavelength translation of a signal is a four-wave optical mixer. Four-wave mixing, however, suffers several disadvantages over difference frequency generation. For a single pump signal, the pump frequency $\omega_p$ is between the two optical carrier frequencies $\omega_1$, $\omega_2$ and the tails of the pump signal, which needs to be large for a third-order non-linear conversion, overlap the optical carrier frequencies. Furthermore, four-wave mixing, being more complex, generates more cross terms, which can interfere with the optical carrier signals. As a result, it is more suitable for converting a single wavelength and is difficult to apply to bulk conversion, that is, the simultaneous conversion of multiple wavelengths.

Yet another all-optical switch previously proposed is a single-pump parametric wavelength cross-connect. However, such a parametric wavelength cross-connect is limited to the conversion of a single wavelength for each non-linear optical element provided.

SUMMARY OF THE INVENTION

The present invention comprises a method and apparatus for multiple-band, optical switching using, for example, a multi-pump parametric switch technique. The switching architecture combines band amplification, wavelength conversion and selective signal conjugation, enabled by the temporal control of at least one optical pump.

In one embodiment of the present invention, a method of optical switching using a fiber parametric device receiving an optical pump signal from at least two optical pump sources includes combining a signal from each of the at least two optical pump sources and an input data signal to produce a combined signal, where at least one of the optical signals from the at least two optical pump sources is controllably modulated. The method further includes imparting a third-order non-linear effect on the combined signal such that a multi-band switched optical signal results. The multi-band switched optical signal includes at least one replica of the input data signal and at least three distinct idler bands. As such, the method may further include separating the combined multi-band switched optical signal into at least four bands comprising the replica of the input data signal and the three distinct idler bands.

In an alternate embodiment of the present invention an optical switch includes at least two optical pump sources and an optical combiner for combining a signal from each of the optical pump sources and an input data signal to produce a combined signal. The optical switch further includes a non-linear optical element for imparting a third-order non-linear effect on the combined signal and at least one optical splitter for separating the combined signal. In the optical switch of the present invention at least one of the optical pump sources is adapted to be controllably modulated such that when the optical signals are combined a logic sequence of the input data signal is controllably switched.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Although various embodiments of the present invention are being described herein with respect to a two-pump parametric switch, it should be noted that the two-pump parametric switch is simply provided as an embodiment of the present invention and should not be treated as limiting the scope of the invention. It will be appreciated by one skilled in the art informed by the teaching of the present invention that the concepts of the present invention may be extended to parametric switches having substantially any number of optical pumps or, more generally, any number of optical sources that may be used to modulate optical signals in the manner described herein with respect to the optical pumps.

Figure 1:
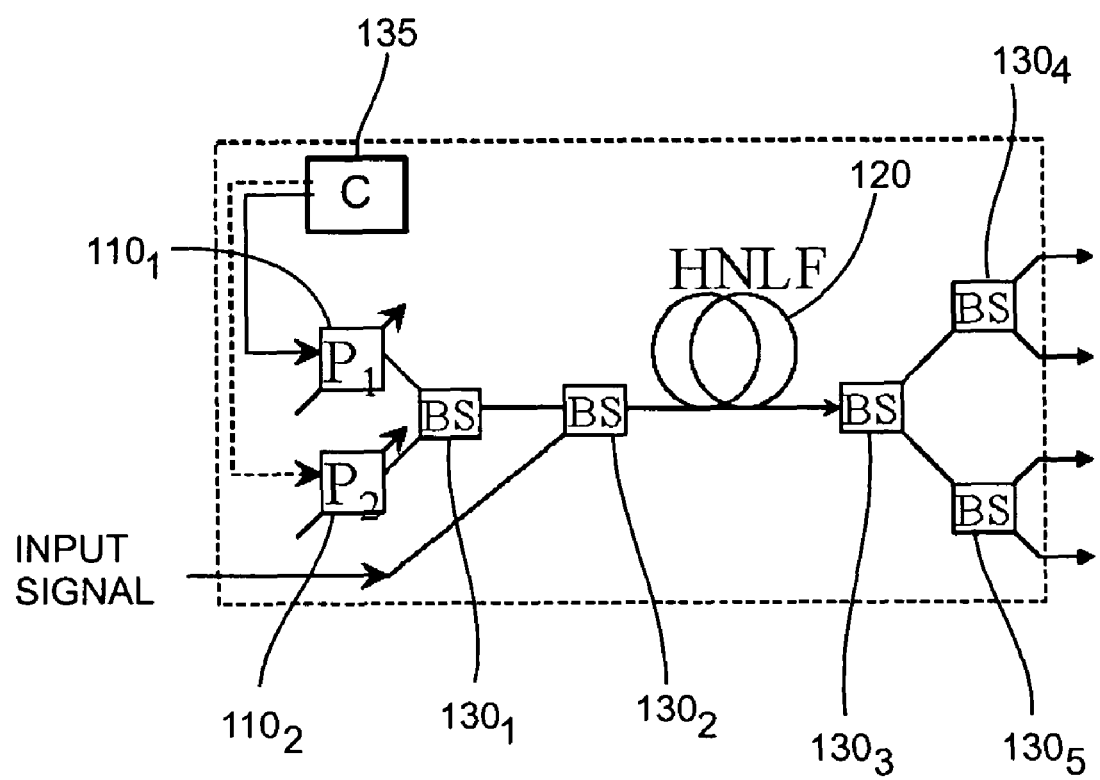
FIG. 1 depicts a high-level block diagram of an embodiment of a two-pump fiber parametric switch (FPS) in accordance with the present invention.

FIG. 1 depicts a high-level block diagram of an embodiment of a two-pump fiber parametric switch (FPS) in accordance with the present invention. The FPS 100 of FIG. 1 comprises two optical pumps $110_1$ and $110_2$ (collectively optical pumps 110), a non-linear optical element exhibiting a third-order non-linear susceptibility $\chi^{(3)}$ (illustratively a highly non-linear fiber (HNLF)) 120, five band splitters $130_1$-$130_5$ (collectively band splitters 130), and a pump controller 135. Optionally, the FPS 100 may further include a common amplifier (not shown) or multiple booster amplifiers (not shown) to amplify the power of the optical pumps 110 to a desired level. In addition, the FPS 100 may further comprise a variable electrical delay line to be used for synchronizing an input data signal and a pulsed pump (described in detail below). Furthermore, although the FPS 100 of FIG. 1 is depicted as comprising a single pump controller 135 for both optical pumps 110, in other embodiments an FPS in accordance with the present invention may comprise a separate pump controller for each optical pump therein. In addition, the pump controller(s), although being depicted as being located within the FPS 100 of FIG. 1, in alternate embodiments of the present invention the pump controller(s) may comprise separate components outside of an FPS of the present invention.

In the FPS 100 of FIG. 1, the pump controller 135 controls the output of the optical pumps 110. That is, the optical pumps may be operated at a constant level or may be pulsed (modulated) to perform the switching of an input optical signal in accordance with the present invention (described in detail below). The pump signals front the optical pumps 110 are combined by the band splitter $130_1$. The combined pump signals are communicated to the second band splitter $130_2$ wherein the combined pump signals are further combined with an input data signal, such as the illustrated WDM signal. The combined pump signals and data signal are communicated to the HNLF 120. In the HNLF 120, the combined signals experience a third-order non-linearity and a parametric amplification which produces a replica of the input data signal and three distinct idler bands. The input data signal and the three idler bands are subsequently separated by the remaining band splitters $130_3$-$130_5$ as depicted in FIG. 1. As such, one or more of the signals at the output band splitters $130_3$-$130_5$ may be selected as the converted/switched output signal.

The principle of parametric devices driven by two pump waves utilized in an FPS in accordance with the present invention is described in "Parametric amplifiers driven by two pump waves", C. J. McKinstrie, S. Radic and A. R. Chraplyvy, IEEE J. Sel. Top., Quantum Electron. 8, 538-547 (2002), which is herein incorporated by reference in its entirety. Briefly stated, in an FPS of the present invention, the frequencies of the optical pumps are configured such that an input signal frequency is higher than the lower pump frequency (hereinafter "the L-band pump") and the primary idler frequency is lower than the higher pump frequency (hereinafter "the C-band pump"). The optical pump frequencies are also chosen such that the L-band pump frequency and the C-band pump frequency are substantially symmetrical about the zero-dispersion wavelength of the non-linear optical element (e.g., the HNLF). In this configuration, the ranges of secondary idler frequencies do not overlap the input signal and primary idler ranges and as such, there is substantially no crosstalk in wavelength-division-multiplexed (WDM) transmission. The inventors determined that the effects of fourth-order dispersion are weaker in this configuration because the signal frequencies are closer to the average pump frequency. Compared to conventional one-pump fiber parametric devices, the two-pump configuration of the FPS 100 of the present invention offers polarization invariance, broadband operation, the ability to generate unimpaired idler signals regardless of the signal spectral position, and an increased Brillouin threshold.

An FPS in accordance with the present invention, such as the FPS 100 of FIG. 1, provides wavelength (frequency) conversion of an input data signal as well as switching capabilities. More specifically, in the FPS 100 of FIG. 1, an input data signal is converted from one wavelength (or frequency) to four distinct wavelengths (or frequencies) via the third-order non-linear effect experienced by the combined optical signals in the HNLF 120 and the parametric gain provided by the two-pump parametric amplification generated within the FPS 100. That is, the use of the two optical pumps 110 in the FPS 100 of FIG. 1 produces three distinct idler bands (i.e., the signal is either mirrored or translated to the corresponding idler band) which are all capable of being switched simultaneously. The time required for outer-to-inner band conversion (e.g., 2+ to 2−) is substantially the same as the duration of the outer-to-outer band conversion (e.g., 2+ to 1−) with dispersion contributing only a small wavelength-dependent latency.

Figure 2:
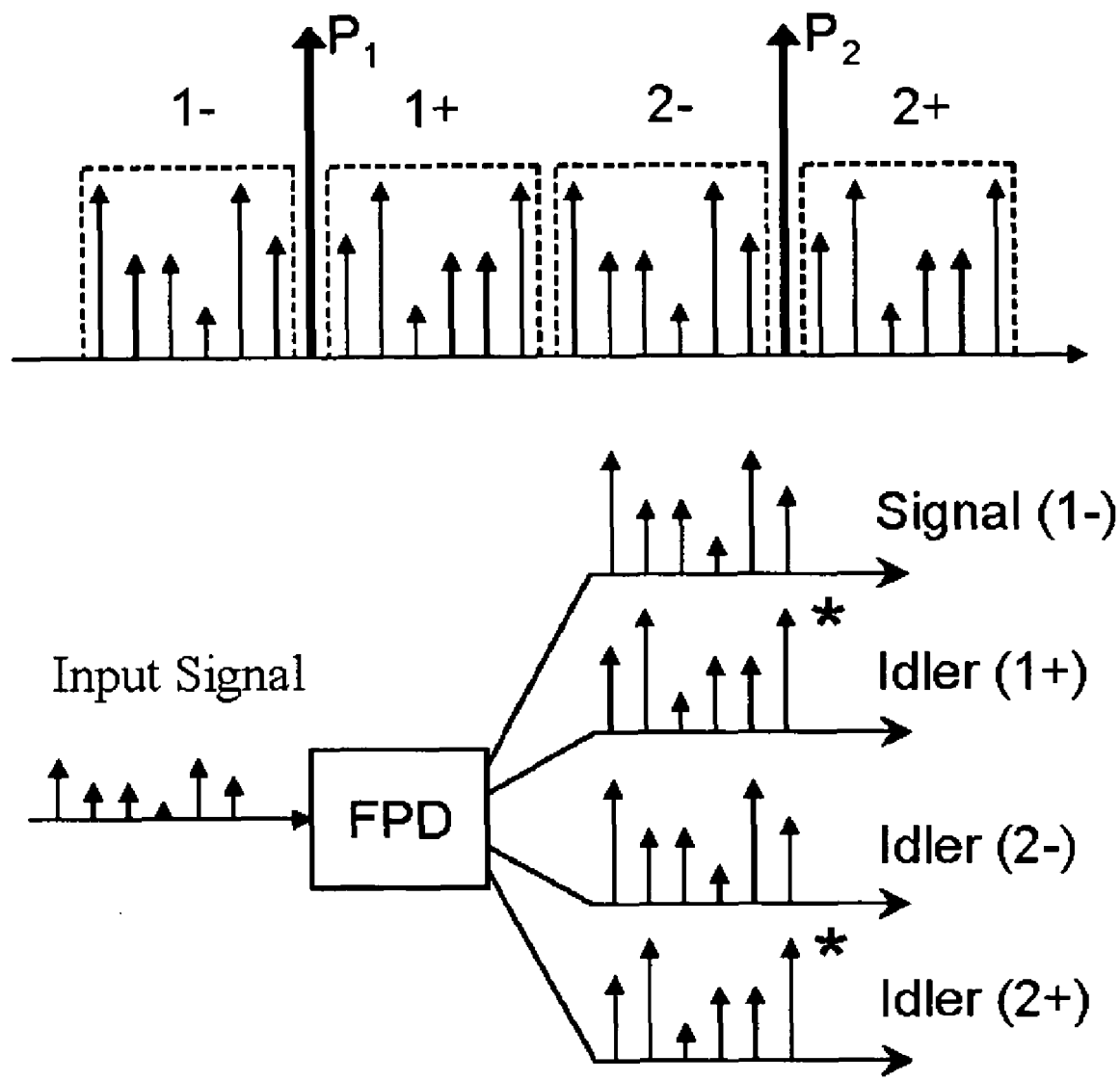
FIG. 2 graphically depicts an exemplary output of the FPS of FIG. 1 with a signal from both of the optical pumps present.

FIG. 2 graphically depicts an exemplary converted output of the FPS 100 of FIG. 1. In FIG. 2, an input signal is communicated to the FPS 100. The signal band (1−) is simultaneously amplified and replicated within four spectral windows. The generated idlers are either spectrally mirrored (idler bands 1+ and 2+) or translated (idler band 2−) replicas. Spectrally mirrored idlers are signal conjugates, which offer the potential for mitigating transmission penalties by regenerating the original input signal from the conjugate after transmission. The four-band nature of the two-pump FPS 100 allows for considerable flexibility in selecting the properties of a converted band. Outer band placement of the signal (1−) depicted in FIG. 2, results in an inner band non-conjugate (2−). A signal positioned within any of the two inner bands (1+ and 2−) generates an outer band non-conjugate.

In an FPS of the present invention, such as the FPS 100 of FIG. 1, the inventors determined that the removal of the signal from either of the optical pumps 110 causes the simultaneous collapse of the corresponding idler bands and a loss of signal gain. With this principle in mind, the inventors determined that the temporal control of either one of the optical pumps 110, alone, or the simultaneous control of both of the optical pumps 110, may be used to perform efficient multiple-band switching. More specifically, in the FPS 100 of FIG. 1, the pump controller 135 is used to iteratively turn a single optical pump or combination of the optical pumps 110 ON and OFF (i.e., modulation of the optical pumps) to produce a desired multi-band switched output signal.

Figure 3:
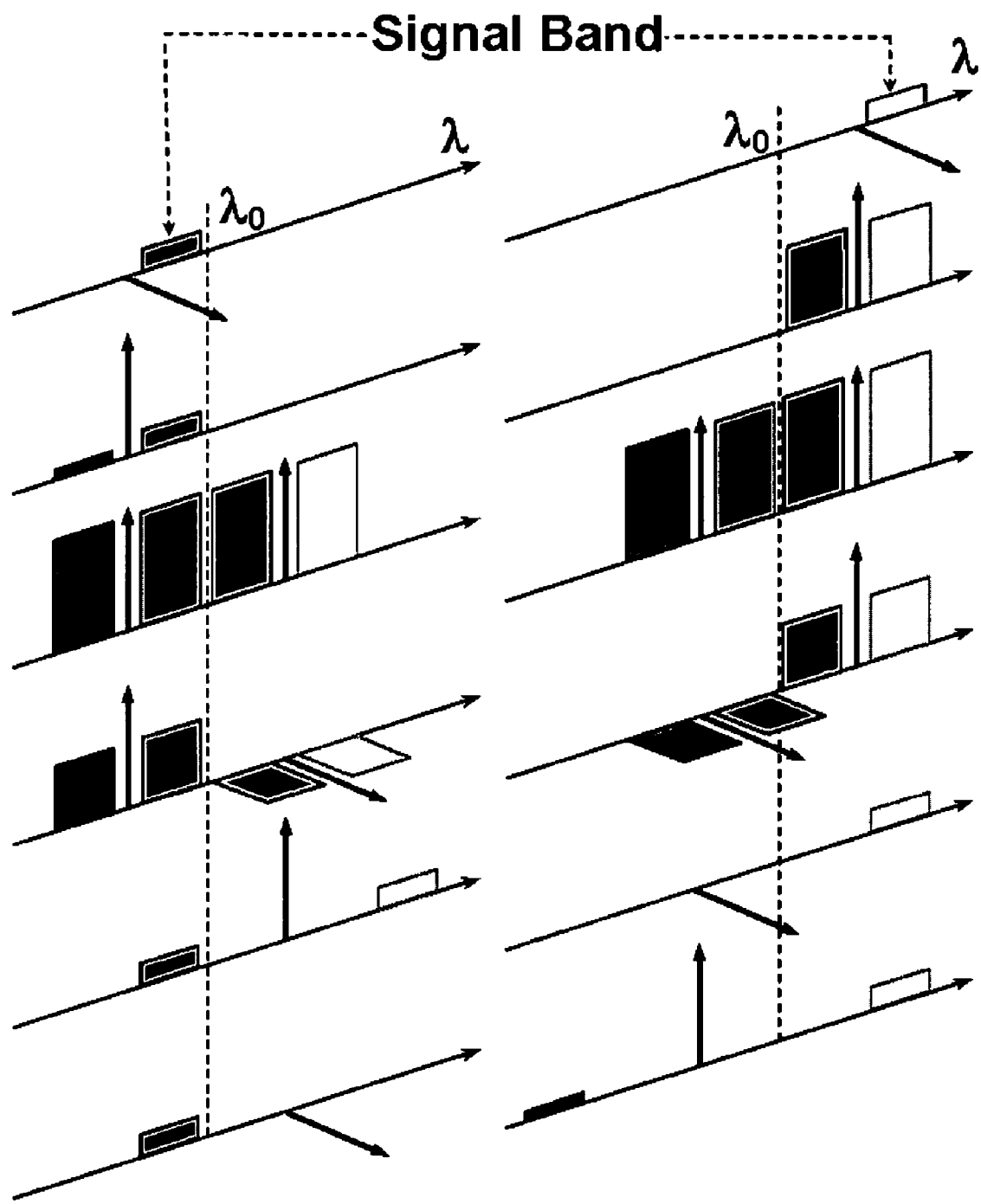
FIG. 3 graphically depicts an input signal band and the various generated idler bands for multiple combinations of the optical pumps of an FPS in accordance with the present invention.

FIG. 3 graphically depicts an input signal band and the various generated idler bands for multiple combinations of the optical pumps of an FPS in accordance with the present invention. In FIG. 3, the relative signal and idler band magnitudes are plotted assuming negligible higher-order HNLF dispersion and birefringence. The optical pumps are either co-polarized or cross-polarized with the input signal. On the left side of FIG. 3, the input signal band is positioned in the vicinity of the operating wavelength of the optical pump operating in the normal dispersion regime (the C-band pump). On the right side, the input signal band is positioned in the vicinity of the operating wavelength of the optical pump operating in the anomalous regime (the L-band pump). $\lambda_0$ depicts the zero-dispersion wavelength. Referring to FIG. 3, it is evident that in various embodiments of the present invention it would be preferable to configure the L-band pump as the optical pump of the present invention to be modulated to produce a desired switched output in accordance with the present invention, because leaving the C-band pump constant results in less noise than leaving the L-band pump constant and modulating the C-band pump to perform the switching of the present invention.

For example and with reference to FIG. 1, if the first optical pump $110_1$ is a C-band pump and the second optical pump $110_2$ is an L-band pump, maintaining the C-band pump at a constant level while modulating the L-band pump switches a logic sequence of an input data signal to a desired output logic sequence. For example, if an input data signal, modulated using a 10 Gb/s sequence 1100110111010111001, is input to the FPS 100 of FIG. 1 and the L-band pump is pulsed using a 10 Gb/s sequence 1000011110000000001, a switched signal/idler sequence that is substantially the Boolean AND of the input data signal and the pulsed pump signal is produced and results in the sequence 1000010110000000001. As such, the converted four bands of an input data signal are all switched and as such result in a multi-band switched optical signal.

The speed of the switching scheme of an FPS in accordance with the present invention, such as the FPS 100 of FIG. 1, depends substantially on the ability to switch the optical pumps 110 ON and OFF (i.e., modulation of the optical pump). This is because the sub-picosecond time constants of the parametric process in silica are nearly instantaneous when compared to current data rates (<1 Tb/s). Although in the description provided above, the controller 135 is depicted as turning an optical pump 110 ON or OFF (i.e., modulating an optical pump) to produce a desired switched output signal, it will be appreciated by those skilled in the art informed by the teachings of the present invention that the ON state may correspond to a signal that is above a predetermined threshold and the OFF state may correspond to a signal that is below a predetermined threshold (or vice versa) and as such the present invention should not be limited to instances wherein an optical pump(s) is turned completely ON or completely OFF.

In accordance with the present invention, a combination of a broadband FPS of the present invention and slow optical modulators (e.g., ~10 Gb/s) may be used to achieve sub-nanosecond switching/conversion over bandwidths exceeding combined C- and L-bands. Furthermore, the use of orthogonally polarized pumps in an FPS of the present invention provides polarization invariant band switching. Conversely, co-polarized pumps may be used when polarization-dependent switching is desired, for example, to discriminate a predetermined signal polarization and the like.

In an experimental setup of an FPS of the present invention, two lasers (optical pumps) were positioned at 1567.0 and 1596.8 nm and phase modulated using 5 Gb/s $2^{31}-1$ psuedo-random bit sequence in order to increase the Brillouin threshold to over 400 mW. A zero-chirp Mach-Zehnder amplitude modulator was used to modulate an L-band source (1596.0 nm) with a programmed 10 Gb/s NRZ sequence. The extinction ratio was 12 dB. The optical pumps were amplified using a single optical amplifier. The use of a single amplifier rather than two separate amplifiers simplifies the construction of an FPS of the present invention and simplifies the path length balancing required for narrow idler generation. The amplified signals from the optical pumps propagate through two identical, 0.6 nm wide filters to attenuate optical noise in the signal and idler bands. The measured powers at the input of the HNLF were 180 and 320 mW for the L- and C-band pumps, respectively. The optical pumps and the optical signal were combined at the input of a 1-km-long HNLF with zero-dispersion wavelength at 1580 nm, dispersion slope of 0.03 ps/nm$^2$ and nonlinear coefficient, $\gamma$,=10 km$^{-1}$W$^{-1}$.

Figure 4:
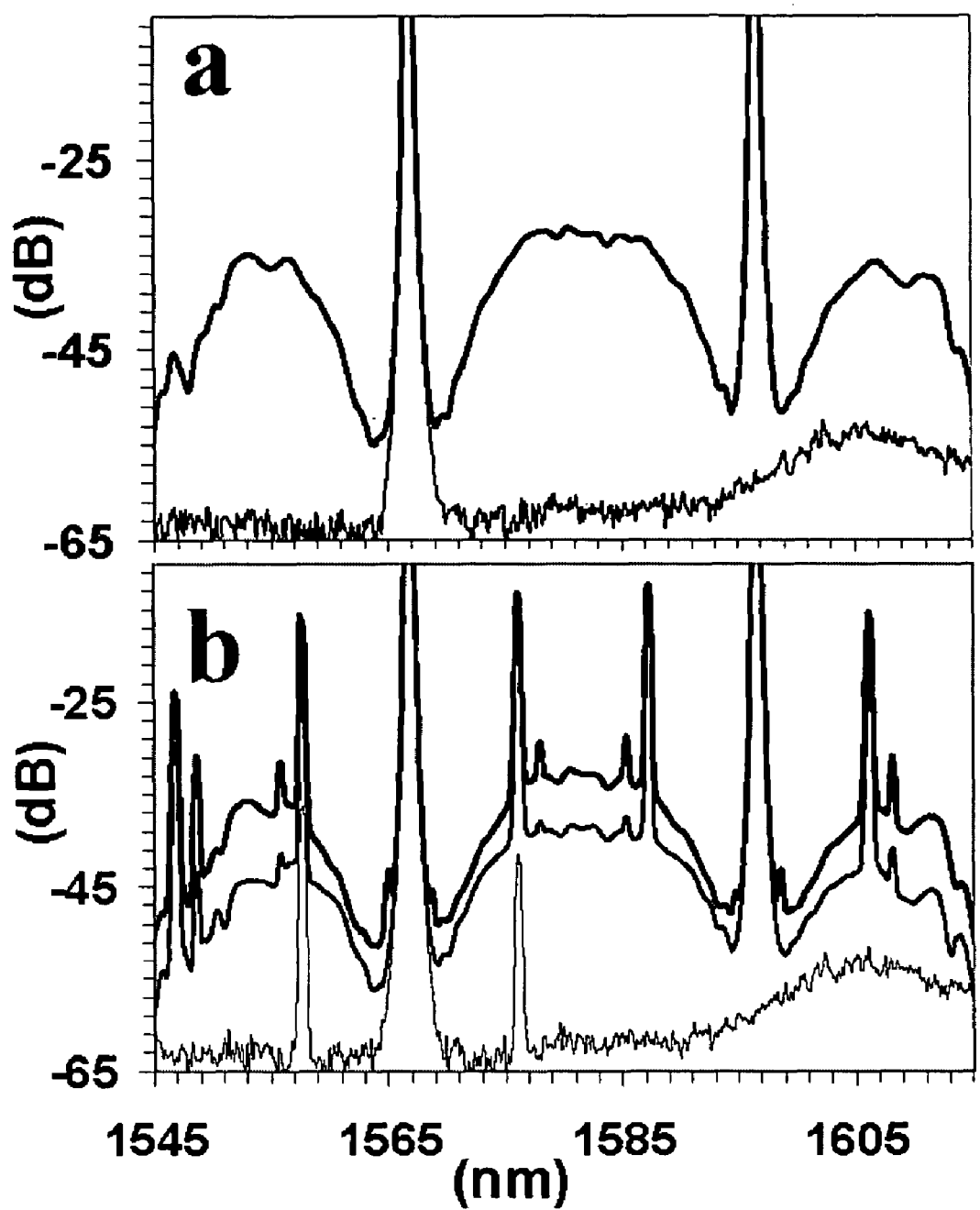
FIG. 4a graphically depicts an output of an embodiment of an FPS in the absence of an input data signal.
FIG. 4b graphically depicts an output of the FPS of FIG. 4a having an applied input data signal and an L-band pump in both the OFF and ON states with two different pump powers for a C-band pump and the L-band pump.

FIG. 4a graphically depicts the output of the FPS of the experimental setup described above in the absence of an input signal. Simultaneous pump operation (L-band pump in ON state) results in strong ASE generation across all-four parametric bands, as depicted by the upper curve. In contrast, in the absence of the anomalous pump (i.e., the L-band pump in OFF state), the C-band pump power is more than doubled, as depicted by the lower curve, since a booster amplifier is operated in constant power regime. Furthermore, the OFF state is characterized by the collapse of the four parametric bands, as also depicted by the lower curve in FIG. 4a. The broadband pedestal peaked at 1605 nm is observed in the OFF state of FIG. 4a. The pedestal represents ASE from the booster amplifier that is not suppressed by the 0.6 nm cleanup filters.

In the experimental setup, a small data signal, Pin=−20 dBm, was RZ modulated at 10 Gb/s and positioned within the inner parametric band (i.e., $\lambda$=1576.1 nm). FIG. 4b graphically depicts the output of the FPS of the experimental setup with the input data signal applied and the L-band pump in the OFF state (lower curve), with the input data signal applied and the C-band pump and L-band pump having respective powers of 280 mW and 120 mW (middle curve), and with the input data signal applied and the C-band pump and L-band pump having respective powers of 320 mW and 180 mW (upper curve). The input data signal was simultaneously amplified within the HNLF of the FPS to an output gain of 29 dB and converted (i.e., the created idler bands) to the wavelengths 1557.7, 1587.2 and 1606.2 nm with efficiencies of 24.6, 30.5 and 26 dB, respectively, relative to the signal power input to the HNLF. FIG. 4b illustrates an effective conversion range for the FPS in excess of 50 nm with a tuning speed comparable to the rise time of the modulator, which is 30-ps. The extinction ratio between the ON and OFF states was measured to be 19 dB at 1557.7 nm, 29 dB at the signal wavelength and better than 50 dB at 1587.2 and 1606.2 nm. By holding the C-band pump power constant (i.e., separate C- and L-band boosters), the 1557.7 nm idler extinction was increased by 6.3 dB, thus improving the worst extinction ratio to 25.3 dB.

Figure 5:
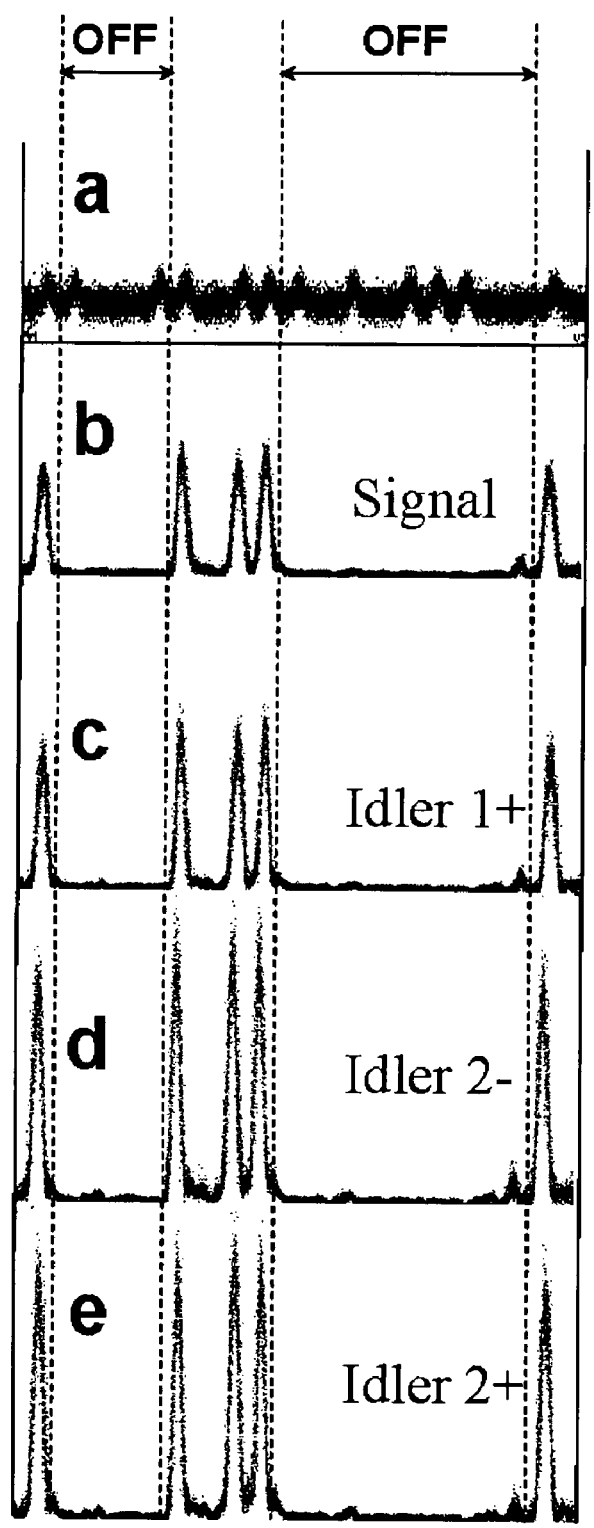
FIG. 5 graphically depicts an output of an embodiment of an FPS of the present invention performing both wavelength conversion and switching.

FIGS. 5a-5e graphically depict the switching of the present invention. For example and with reference to the previous experimental setup, if a received data signal is modulated using the 10 Gb/s sequence, 11001101111010111001, and the L-band pump of the FPS is pulsed using 10 Gb/s sequence, 10000111110000000001 an output data signal would have the sequence 10000101110000000001. FIG. 5a graphically depicts the above described input data signal and specifically the 10 Gb/s sequence. FIG. 5b graphically depicts the switched 1576.1 nm input data signal. It is evident from FIG. 5b that a resulting converted output signal of the FPS comprises a switched sequence that, as described above, is substantially a Boolean AND of the logic sequence of the input data signal and the logic sequence of the pulsed optical pump signal (the L-band pumps signal).

FIGS. 5c-5e graphically depict the created and switched 1557.7 nm idler, the 1587.2 nm idler, and the 1606.2 nm idler, respectively. Again, it is evident from FIGS. 5c-5e that resulting created idlers comprise a switched sequence that is substantially a Boolean AND of the logic sequence of the input data signal and the logic sequence of the pulsed optical pump signal (the L-band pumps signal).

As previously stated, the performance of the switching of the present invention is limited by the speed and extinction ratio of the modulation of the optical pump(s). For simplicity, it may be assumed that signal amplification and idler generation is dominated by the non-degenerate phase conjugated process (i.e., the spectral separation of the input data signal and the optical pumps is large). As a worst-case extinction estimate, it may be assumed that a) partially degenerate (one pump) phase conjugation provides gain in the OFF pump state, and b) the signal and idler experience maximal gain (an ideal phase matching condition) for both ON and OFF states. The extinction ratio may then be characterized according to equation one (1), which follows:

$$\frac{P_{SIG}^{ON}}{P_{SIG}^{OFF}} \sim \exp(2\gamma\sqrt{P_C^{ON} P_L^{ON}}\, L_{eff}) / \exp(2\gamma\sqrt{P_C^{OFF} P_L^{OFF}}\, L_{eff}) = $$

$$e^{2\gamma L_{eff}\left(\sqrt{P_C^{ON} P_L^{ON}} - \sqrt{P_C^{OFF} P_L^{OFF}}\right)} \quad (1)$$

where $P^{ON,OFF}_{C,L}$ are the pump powers in the ON and OFF positions and $L_{eff}$ is the effective HNLF interaction length[2]. When only the L-band pump is switched and a single booster with constant output power of 2P is used for the C-band and L-band pumps, the pump powers are $P_C^{OFF} \cong 2P_C^{ON} \cong 2P$ and $P_L^{OFF} \cong aP_L^{ON} \cong aP$, where a depicts the extinction ratio of the L-band pump. The inter-pump Raman interaction is neglected. Thus the worst-case extinction for the switched signal is now characterized according to equation two (2), which follows:

$$e^{2\gamma L_{eff} P e^{-\sqrt{2a}}} \sim e^{1.3\gamma L_{eff} P}. \quad (2)$$

For the previously described experimental setup parameters ($\gamma=10\,km^{-1}W^{-1}$, $a=-12\,dB$, $L_{eff}\sim 1\,km$, and $P_{1,2}=250\,mW$) the worst-case extinction ratio is estimated to be $-14$ dB. The maximal gain assumption is inherently achromatic and should be used for lower-bound estimate of the extinction ratio. Indeed, the observed signal/idler extinctions are better than $-14$ dB. It should be noted that the worst extinction should be expected during the pump rise/fall times.

Although various embodiments of the present invention were described and illustrated above with respect to a fiber parametric switch (FPS) comprising two optical pumps, it will be appreciated by those skilled in the art informed by the teachings of the present invention that other embodiments of a fiber parametric switch (FPS) in accordance with the present invention may comprise more than two optical pumps. For example, a fiber parametric switch (FPS) in accordance with the present invention may comprise three optical pumps and as such an input data signal when combined with the three optical pumps in the non-linear medium of the present invention, will produce at least six conversion bands. In this embodiment, either a single pump, or substantially any combination of the optical pumps, may be modulated to perform the optical switching of the present invention.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. An optical switch, comprising:
  a first optical combiner for combining at least two optical pump signals to produce a combined pump signal, and a second optical combiner for combining an input data signal with the combined pump signal to produce a combined signal;
  a non-linear optical element for imparting a non-linear effect on the combined signal to generate a number of optical bands based on a simultaneous three-signal interaction of the at least two optical pump signals and the input data signal; and
  at least one optical splitter for separating the combined signal from said non-linear optical element into respective generated optical bands;
  wherein at least one of said at least two optical pump signals is controllably modulated such that a logic sequence of said input data signal is controllably switched.

2. The optical switch of claim 1, further comprising at least two optical pump sources, each of said sources providing one of said at least two optical pump signals, wherein at least one of said at least two optical pump sources is adapted to controllably modulate its respective optical signal such that a logic sequence of said input data signal is controllably switched and an output signal of said optical switch comprises a multi-band switched optical signal.

3. The optical switch of claim 1, wherein said input data signal has a frequency that is substantially equal to an average of respective frequencies of said at least two optical pump sources.

4. The optical switch of claim 2, further comprising a controller for controlling the modulation of the at least one modulated optical pump source.

5. The optical switch of claim 2, wherein one of said at least two optical pumps is modulated and all other optical pumps are maintained constant.

6. The optical switch of claim 5, wherein a resulting multi-band switched output signal is substantially a Boolean AND combination of the logic sequence of said input data signal and the logic sequence of said modulated optical pump signal.

7. The optical switch of claim 5, further comprising a variable delay line for synchronizing the input data signal and the modulated optical pump.

8. The optical switch of claim 1, wherein said non-linear optical element comprises a highly non-linear fiber.

9. The optical switch of claim 1, wherein said non-linear optical element generates a parametric amplification of the combined signals.

10. The optical switch of claim 9, wherein said non-linear effect comprises difference frequency generation.

11. The optical switch of claim 9, wherein an output of said optical switch comprises a replica of said input data signal and at least three idler signals.

12. The optical switch of claim 11, wherein said at least three idler signals comprise at least two mirrored idler signals and at least one translated idler signal.

13. The optical switch of claim 12, wherein said mirrored idler signals comprise input data signal conjugates.

14. The optical switch of claim 9, wherein each wavelength of said input data signal is converted into a corresponding wavelength in said respective generated optical bands.

15. The optical switch of claim 2, wherein said optical pump sources comprise laser sources.

16. The optical switch of claim 1, wherein each of said first and second optical combiner comprises a band splitter.

17. The optical switch of claim 1, wherein said at least one optical splitter comprises a band splitter.

18. A method of optical switching using a fiber parametric device having at least two optical pump sources, comprising:
    combining a signal from each of said at least two optical pump sources in a first combiner to produce a combined pump signal, and combining the combined pump signal with an input data signal to produce a combined signal;
    imparting a non-linear effect on the combined signal to generate a number of optical bands based on a simultaneous three-signal interaction of the two optical pump signals and the input data signal; and
    controllably modulating at least one of said at least two optical pump sources such that a logic sequence of said input data signal is controllably switched.

19. The method of claim 18, further comprising separating said generated optical bands using one or more band splitters.

20. The method of claim 19, wherein said non-linear effect generates a parametric amplification of said combined signal such that an output of said fiber parametric device comprises one or more switched optical signals corresponding to one or more of the generated optical bands.

21. The method of claim 20, wherein the output of said fiber parametric device comprises at least a replica of said input data signal and three distinct idler bands.

22. An optical switch, comprising:
    a first optical combiner for combining at least two optical pump signals to produce a combined pump signal, and a second optical combiner for combining an input data signal with the combined pump signal to produce a combined signal;
    a non-linear optical element for imparting a non-linear effect on the combined signal; and
    at least one optical splitter for separating the combined signal from said non-linear optical element into respective generated optical bands;
    wherein at least one of said at least two optical pump signals is controllably modulated such that a logic sequence of said input data signal is controllably switched; and
    wherein said input data signal has a frequency that is substantially equal to an average of respective frequencies of said at least two optical pump sources.

* * * * *